US011166461B2

(12) United States Patent
Gaberthueel

(10) Patent No.: US 11,166,461 B2
(45) Date of Patent: Nov. 9, 2021

(54) METHODS OF CONTROLLING OR PREVENTING INFESTATION OF SOYBEAN PLANTS BY PHYTOPATHOGENIC MICROORGANISMS

(71) Applicant: SYNGENTA PARTICIPATIONS AG, Basel (CH)

(72) Inventor: Matthias Gaberthueel, Basel (CH)

(73) Assignee: SYNGENTA PARTICIPATIONS AG, Basel (CH)

( * ) Notice: Subject to any disclaimer, the term of this patent is extended or adjusted under 35 U.S.C. 154(b) by 0 days.

(21) Appl. No.: 16/631,377

(22) PCT Filed: Aug. 8, 2018

(86) PCT No.: PCT/EP2018/071558
§ 371 (c)(1),
(2) Date: Jan. 15, 2020

(87) PCT Pub. No.: WO2019/030307
PCT Pub. Date: Feb. 14, 2019

(65) Prior Publication Data

US 2020/0214291 A1 Jul. 9, 2020

(30) Foreign Application Priority Data

Aug. 9, 2017 (EP) .................................... 17185509
Nov. 17, 2017 (EP) .................................... 17202349

(51) Int. Cl.
*A01N 43/40* (2006.01)
*A01G 13/00* (2006.01)

(52) U.S. Cl.
CPC .............. *A01N 43/40* (2013.01); *A01G 13/00* (2013.01)

(58) Field of Classification Search
CPC ................................ A01N 43/40; A01G 13/00
See application file for complete search history.

(56) References Cited

U.S. PATENT DOCUMENTS

2011/0098477 A1* 4/2011 Aoki ..................... C07C 229/36 546/335
2015/0223457 A1 8/2015 Olaya-Huertas et al.
2016/0075653 A1 3/2016 Decor et al.

FOREIGN PATENT DOCUMENTS

WO 2013143811 A1 10/2013
WO 2015003951 A1 1/2015
WO 2016066644 A1 5/2016
WO WO-2016066644 A1 * 5/2016 ............. A01N 43/32
WO 2017207362 A1 12/2017
WO 2018114657 A1 6/2018

OTHER PUBLICATIONS

International Search Report for International Application No. PCT/EP2018/071558 dated Oct. 25, 2018.

* cited by examiner

*Primary Examiner* — Ali Soroush
(74) *Attorney, Agent, or Firm* — BakerHostetler; Toni-Junell Herbert

(57) ABSTRACT

The present invention relates to methods for controlling or preventing infestation of soybean by phytopathogenic microorganisms, in particular of the *Fusarium* genus, *Sclerotinia sclerotiorum, Microsphaera diffusa, Septoria glycines* and *Cercospora sojina*, more particularly *Fusarium virguliforme, Fusarium solani, Fusarium oxysporum, Fusarium acuminatum, Fusarium chlamydosporum, Fusarium compactum, Fusarium culmorum, Fusarium equiseti, Fusarium graminearum, Fusarium merismoides, Fusarium proliferatum, Fusarium pseudograminearum, Fusarium semitectum, Fusarium subglutinans* and *Fusarium verticilliodes*, comprising applying to a crop of plants, the locus thereof, or propagation material thereof, a compound according to formula (I), wherein R1, R2, R3, R4, R5, Y, A, B are as defined herein.

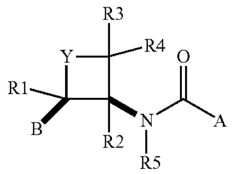

(I)

13 Claims, No Drawings

METHODS OF CONTROLLING OR PREVENTING INFESTATION OF SOYBEAN PLANTS BY PHYTOPATHOGENIC MICROORGANISMS

CROSS-REFERENCE TO RELATED APPLICATIONS

This application is a 371 National Stage application of International Application No. PCT/EP2018/071558 filed Aug. 8, 2018 which claims priority to EP 17185509.1, filed Aug. 9, 2017, and EP 17202349.1, filed Nov. 17, 2017, the entire contents of which applications are hereby incorporated by reference.

TECHNICAL FIELD

The present invention relates to methods for controlling or preventing infestation of soybean plants by phytopathogenic microorganisms, in particular of the *Fusarium* genus, *Sclerotinia sclerotiorum, Microsphaera diffusa, Septoria glycines* and *Cercospora sojina.*

BACKGROUND

Sudden Death Syndrome (SDS) is one of the top yield-robbing pests in soybeans, particularly in the US. Over the last five years, average annual damage caused by SDS cost soybean growers more than 44 million bushels in lost yield, and the spread of the disease continues to climb. SDS is caused by a *Fusarium* fungi, more specifically the soil borne root pathogen *Fusarium virguliforme.* Hence, there is a need to provide efficient alternative methods for controlling or preventing this pest and other pests such as *Sclerotinia* stem rot (White Mold), mildew, *Septoria*, frogeye leaf spot in soybean.

Thus, the current invention provides further methods for controlling or preventing infestation of soybean plants by phytopathogenic microorganisms, in particular of the *Fusarium* genus, more particularly *Fusarium virguliforme.*

DESCRIPTION OF THE EMBODIMENTS

Cyclobutylcarboxamide compounds and processes for their preparation have been disclosed in WO2013/143811 and WO2015/003951. It has now been surprisingly found that particular cyclobutylcarboxamide compounds disclosed in WO2013/143811 and/or WO2015/003951 are highly effective at controlling or preventing the infestation of soybean plants by phytopathogenic microorganisms of the *Fusarium* genus, in particular *Fusarium virgulforme*. These highly effective compounds thus represent an important new solution for farmers to control or prevent infestation of soybean plants by the sudden death syndrome.

Hence, as embodiment 1, there is provided a method of controlling or preventing infestation of soybean plants by phytopathogenic microorganisms, in particular of the *Fusarium* genus, *Sclerotinia sclerotiorum, Microsphaera diffusa, Septoria glycines* and *Cercospora sojina*, more particularly *Fusarium virguliforme, Fusarium solani, Fusarium oxysporum, Fusarium acuminatum, Fusarium chlamydosporum, Fusarium compactum, Fusarium culmorum, Fusarium equiseti, Fusarium graminearum, Fusarium merismoides, Fusarium proliferatum, Fusarium pseudograminearum, Fusarium semitectum, Fusarium subglutinans* and *Fusarium verticilliodes*, comprising applying to a crop of plants, the locus thereof, or propagation material thereof, a compound according to formula (I)

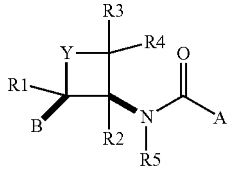

(I)

wherein

Y is O, C=O, or CR12R13;

A is a 5- or 6-membered heteroaromatic ring containing 1 to 3 heteroatoms, each independently selected from oxygen, nitrogen and sulphur, or a phenyl ring; the heteroaromatic ring or the phenyl being optionally substituted by one or more R6;

R6 is, independently of each other, halogen, cyano, C1-C4-alkyl, C1-C4-haloalkyl, C1-C4-alkoxy, C1-C4-haloalkoxy, C1-C4-haloalkylthio, C1-C4-alkoxy-C1-4-alkyl or C1-C4-haloalkoxy-C1-C4-alkyl;

R1, R2, R3, R4, R12 and R13, independently of each other, are hydrogen, halogen, cyano, C1-C4-alkyl, C1-C4-alkoxy or C1-C4-haloalkyl, R5 is hydrogen, methoxy or hydroxyl, B is phenyl substituted by one or more R8, R8 is, independently of each other, halogen, cyano or a group -L-R9, where each L is independently of each other a bond, —O—, —OC(O)—, —NR7-, —NR7CO—, —NR7S(O)n-, —S(O)n-, —S(O)nNR7-, —COO— or CONR7-, n is 0, 1 or 2, R7 is hydrogen, C1-C4-alkyl, C1-C4-haloalkyl, benzyl or phenyl, where benzyl and phenyl is unsubstituted or substituted with halogen, cyano, C1-C4-alkyl or C1-C4-haloalkyl, R9 is, independently of each other, C1-C6-alkyl, which is unsubstituted or substituted by one or more R10, C3-C6-cycloalkyl, which is unsubstituted or substituted by one or more R10, C6-C14-bicycloalkyl, which is unsubstituted or substituted by one or more R10, C2-C6-alkenyl, which is unsubstituted or substituted by one or more R10, C2-C6-alkynyl, which is unsubstituted or substituted by one or more R10, phenyl, which is unsubstituted or substituted by R10, or heteroaryl, which is unsubstituted or substituted by one or more R10, R10 is, independently of each other, halogen, cyano, C1-C4-alkyl, C1-C4-haloalkyl, C1-C4-alkoxy, C1-C4-haloalkoxy, C1-C4-alkylthio, C1-C4-haloalkylthio, C3-C6-alkenyloxy, or C3-C6-alkynyloxy;

or a salt or N-oxide thereof;

wherein B and A-CO—NR5 are cis to each other on the four-membered ring, or a tautomer or stereoisomer of these compounds.

More preferred methods according to embodiment 1 are given in the embodiments below.

As embodiment 2, there is provided a method according to embodiment 1 wherein

Y is O or CH2;

A is a 6-membered heteroaromatic ring containing 1 to 2 nitrogen atoms, or a phenyl ring; the heteroaromatic ring or the phenyl being optionally substituted by one or more R6;

R6 is, independently of each other, halogen, cyano, C1-C4-alkyl, C1-C4-haloalkyl, or C1-C4-haloalkoxy;

R1, R2, R3, R4, and R5 are each hydrogen;

B is phenyl substituted by one or more R8;

R8 is, independently of each other, selected from halogen, cyano, C1-C4-alkyl, C1-C4-haloalkyl, C1-C4-haloalkoxy and C3-C6-cycloalkyl.

As embodiment 3, there is provided a method according to either embodiment 1 or embodiment 2 wherein A is a 6-membered heteroaromatic ring containing 1 to 2 nitrogen atoms and having 1 to 3 substituents selected from R6, or a phenyl ring having 1 or 3 substitutents selected from R6.

As embodiment 4, there is provided a method according to any one of embodiments 1 to 3 wherein B is a phenyl substituted by 1 to 3 substitutents R8.

As embodiment 5, there is provided a method according to any one of embodiments 1 to 4 wherein B is a phenyl substituted by 1 to 3 substituents, independently selected from fluoro, chloro, trifluoromethyl, cyclopropyl, difluoromethoxy and trifluoromethoxy;

A is a phenyl, pyridyl or pyrazinyl, which rings, independently of each other, are unsubstituted or substituted by 1 to 3 substituents, independently selected, from chloro, bromo, fluoro, methyl, cyano, and trifluoromethyl, Y is O or CH2, and R1, R2, R3, R4 and R5 are each hydrogen.

As embodiment 6, there is provided a method according to any one of embodiments 1 to 5 wherein Y is CH2;

B is a mono or di-halogen substituted phenyl;

A is selected from phenyl, pyrazinyl and pyridyl, each of which is mono or di-substituted by substituents independently selected from halogen and C1-C4-haloalkyl;

R1, R2, R3, R4 and R5 are each hydrogen.

Compounds of formula (I) as disclosed in any one of embodiments 1 to 6 represent the cis racemate: the phenyl ring on the left hand side and the A-C(═O)—NH group on the right hand side are cis to each other on the cyclobutyl ring:

(Ia)

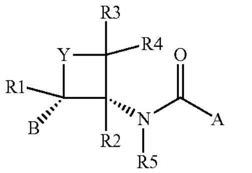

or (Ib)

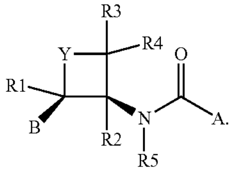

Thus, the racemic compound of formula (I) is a 1:1 mixture of the compounds of formula (Ia) and (Ib). The wedged bonds shown in the compounds of formula (Ia) and (Ib) represent absolute stereochemistry, whereas the thick straight bonds such as those shown for the compounds of formula (I) represent relative stereochemistry in racemic compounds.

It has also surprisingly been found that one enantiomer of the compounds of formula (I) is particularly useful in controlling or preventing the infestation of soybean plants by phytopathogenic microorganisms of the *Fusarium* genus, particularly *Fusarium virgulforme.*

Thus, as embodiment 7, there is provided the method according to embodiment 1 wherein the compound is of formula (Ia)

(Ia)

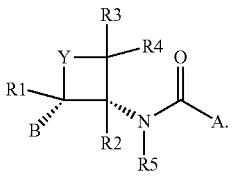

A skilled person is aware that according to the method of embodiment 2, the compound of formula (Ia) is generally applied as part of a pesticidal composition. Hence, as embodiment 8, there is provided a method of controlling or preventing infestation of soybean plants by phytopathogenic microorganisms of the *Fusarium* genus, particularly *Fusarium virgulforme*, comprising applying to a crop of plants, the locus thereof, or propagation material thereof a pesticidal composition comprising a compound according to anyone of embodiments 1-7 and one or more formulation adjuvants. As embodiment 9, there is provided a method of controlling or preventing infestation of soybean plants by phytopathogenic microorganisms of the *Fusarium* genus, particularly *Fusarium virgulforme*, comprising applying to a crop of plants, the locus thereof, or propagation material thereof a pesticidal composition comprising a compound of formula (Ia) and one or more formulation adjuvants. In a method according to embodiment 9, for pesticidal compositions comprising both a compound of formula (Ia) and a compound of formula (Ib), the ratio of the compound of formula (Ia) to its enantiomer (the compound of formula (Ib)) must be greater than 1:1. Preferably, the ratio of the compound of formula (Ia) to the compound of formula (Ib) is greater than 1.5:1, more preferably greater than 2.5:1, especially greater than 4:1, advantageously greater than 9:1, desirably greater than 20:1, in particular greater than 35:1.

Mixtures containing up to 50%, preferably up to 40%, more preferably up to 30%, especially up to 20%, advantageously up to 10%, desirably up to 5%, in particular up to 3%, of the trans stereoisomers of the compounds of formula (I) (i.e. wherein the B and the A-C(═O)—NH groups are trans to each other) are also understood to be part of this invention. Preferably, the ratio of the compound of formula (I) to its trans isomer is greater than 1.5:1, more preferably greater than 2.5:1, especially greater than 4:1, advantageously greater than 9:1, desirably greater than 20:1, in particular greater than 35:1.

Preferably, in a composition comprising the compound of formula (Ia), its trans isomer (i.e. wherein the B and the A-CO—NR2 groups are trans to each other) and the compound of formula (Ib), the composition comprises the compound of formula (Ia) in a concentration of at least 50%, more preferably 70%, even more preferably 85%, in particular over 90%, and particularly preferably over 95%, each based on the total amount of compound of formula (Ia), its trans isomer and the compound of formula (Ib).

Further, as embodiment 10, there is provided a method of controlling or preventing infestation of soybean plants by phytopathogenic microorganisms of the *Fusarium* genus, particularly *Fusarium virgulforme*, comprising applying to a crop of plants, the locus thereof, or propagation material thereof, a compound according to formula (Ic)

(Ic)

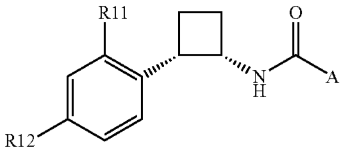

wherein

R11 and R12 are independently selected from halogen;

A is pyridyl which is substituted by one or two substituents independently selected from halogen and $C_1$-$C_4$-haloalkyl.

As embodiment 11, there is provided a method according to embodiment 10, wherein R11 and R12 are independently selected from chloro and fluoro;

A is pyrid-2-yl or pyrid-3-yl, which is substituted by one or two C1-C4-haloalkyl substituents.

As embodiment 12, there is provided a method according to embodiments 10 or 11, wherein A is selected from

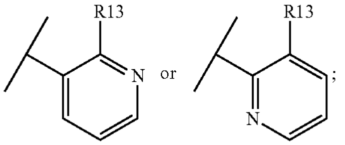

R13 is $C_1$-$C_4$-haloalkyl, preferably trifluoromethyl.

As embodiment 13, there is provided a method according to any one of embodiments 10 to 12 wherein the compound is selected from any one of compounds 1 to 12 of formula (Ic)

(Ic)

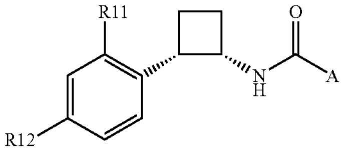

wherein R11, R12 and A are as defined in the following table:

| Compound | A | R11 | R12 |
|---|---|---|---|
| 1 | 2-trifluoromethyl-pyrid-3-yl | Cl | Cl |
| 2 | 3-trifluoromethyl-pyrid-2-yl | Cl | Cl |
| 3 | 3-trifluoromethyl-pyrid-2-yl | F | F |
| 4 | 3-trifluoromethyl-pyrid-2-yl | Cl | F |
| 5 | 3-chloro-pyrid-2-yl | Cl | Cl |
| 6 | 2-methyl-pyrid-3-yl | Cl | Cl |
| 7 | 2-trifluoromethyl-pyrid-3-yl | Cl | F |

As embodiment 14, there is provided the method according to any one of embodiments 1 to 13 comprising the steps providing a composition comprising a compound as defined in any one of embodiments 1 to 13;

applying the composition to a propagation material;

planting the propagation material.

As embodiment 15, there is provided the method according to any one of embodiments 1 to 13 comprising the steps providing a composition comprising a compound as defined in any one of embodiments 1 to 13;

applying the composition to a crop of plants or the locus thereof.

As embodiment 16, there is provided the use of a compound as defined in any one of embodiments 1 to 13 for controlling or preventing infestation of soybean plants by phytopathogenic microorganisms of the *Fusarium* genus.

As embodiment 17, there is provided the use of a compound according to embodiment 16 wherein the phytopathogenic microorganism is *Fusarium virguliforme.*

As embodiment 18, there is provided a method for growing soybean plants comprising applying or treating soybean or a propagation material thereof with a compound as defined in any one of claims 1 to 13.

The preparation of the compounds as defined in the methods of any one of embodiments 1 to 13 has been disclosed in WO2013/143811 and WO2015/003951 which are incorporated herein by reference.

DEFINITIONS

The term "halogen" represents fluoro, chloro, bromo or iodo, particularly fluoro, chloro or bromo.

The term "alkyl" or "alk" as used herein either alone or as part of a larger group (such as alkoxy, alkylthio, alkoxycarbonyl and alkylcarbonyl) is a straight or branched chain and is, for example, methyl, ethyl, n-propyl, n-butyl, isopropyl, sec-butyl, isobutyl, tert-butyl, pentyl, iso-pentyl or n-hexyl. The alkyl groups are suitably $C_1$-$C_4$-alkyl groups.

"Haloalkyl" as used herein are alkyl groups as defined above which are substituted with one or more of the same or different halogen atoms and are, for example, $CF_3$, $CF_2Cl$, $CF_2H$, $CCl_2H$, $FCH_2$, $ClCH_2$, $BrCH_2$, $CH_3CHF$, $(CH_3)_2CF$, $CF_3CH_2$ or $CHF_2CH_2$.

The methods and uses according to any one of embodiments 1 to 18 are preferably for controlling or preventing infestation of the crop by phytopathogenic microorganisms of the *Fusarium* genus, particularly *Fusarium virgulforme*, including *Fusarium* fungi that are resistant to other fungicides. *Fusarium* fungi that are "resistant" to a particular fungicides refer e.g. to strains of *Fusarium* that are less sensitive to that fungicide compared to the expected sensitivity of the same species of *Fusarium*. The expected sensitivity can be measured using e.g. a strain that has not previously been exposed to the fungicide.

Application according to the methods or uses according to any one of embodiments 1 to 18 is preferably to a crop of plants, the locus thereof or propagation material thereof. Preferably application is to a crop of plants or propagation material thereof, more preferably to propagation material. Application of the compounds of the invention can be performed according to any of the usual modes of application, e.g. foliar, drench, soil, in furrow etc.

The compounds as defined in any one of embodiments 1 to 13 are preferably used for pest control at 1 to 500 g/ha, preferably 10-70 g/ha.

The compounds as defined in any one of embodiments 1 to 13 are suitable for use on any soybean plant, including those that have been genetically modified to be resistant to active ingredients such as herbicides, or to produce biologically active compounds that control infestation by plant pests.

Generally, a compound as defined in any one of embodiments 1 to 13 is used in the form of a composition (e.g. formulation) containing a carrier. A compound as defined in any one of embodiments 1 to 13 and compositions thereof can be used in various forms such as aerosol dispenser, capsule suspension, cold fogging concentrate, dustable powder, emulsifiable concentrate, emulsion oil in water, emulsion water in oil, encapsulated granule, fine granule, flowable concentrate for seed treatment, gas (under pressure), gas generating product, granule, hot fogging concentrate, macrogranule, microgranule, oil dispersible powder, oil miscible flowable concentrate, oil miscible liquid, paste, plant rodlet, powder for dry seed treatment, seed coated with a pesticide, soluble concentrate, soluble powder, solution for seed treatment, suspension concentrate (flowable concentrate), ultra low volume (ulv) liquid, ultra low volume (ulv) suspension, water dispersible granules or tablets, water dispersible powder for slurry treatment, water soluble granules or tablets, water soluble powder for seed treatment and wettable powder.

A formulation typically comprises a liquid or solid carrier and optionally one or more customary formulation auxiliaries, which may be solid or liquid auxiliaries, for example unepoxidized or epoxidized vegetable oils (for example epoxidized coconut oil, rapeseed oil or soya oil), antifoams, for example silicone oil, preservatives, clays, inorganic compounds, viscosity regulators, surfactant, binders and/or tackifiers. The composition may also further comprise a fertilizer, a micronutrient donor or other preparations which influence the growth of plants as well as comprising a combination containing the compound of the invention with one or more other biologically active agents, such as bactericides, fungicides, nematocides, plant activators, acaricides, and insecticides.

The compositions are prepared in a manner known per se, in the absence of auxiliaries for example by grinding, screening and/or compressing a solid compound of the present invention and in the presence of at least one auxiliary for example by intimately mixing and/or grinding the compound of the present invention with the auxiliary (auxiliaries). In the case of solid compounds of the invention, the grinding/milling of the compounds is to ensure specific particle size.

Examples of compositions for use in agriculture are emulsifiable concentrates, suspension concentrates, microemulsions, oil dispersibles, directly sprayable or dilutable solutions, spreadable pastes, dilute emulsions, soluble powders, dispersible powders, wettable powders, dusts, granules or encapsulations in polymeric substances, which comprise—at least—a compound as defined in any one embodiments 1 to 13 and the type of composition is to be selected to suit the intended aims and the prevailing circumstances.

As a rule, the compositions comprise 0.1 to 99%, especially 0.1 to 95%, of compound as defined in any one of embodiments 1 to 7 and 1 to 99.9%, especially 5 to 99.9%, of at least one solid or liquid carrier, it being possible as a rule for 0 to 25%, especially 0.1 to 20%, of the composition to be surfactants (% in each case meaning percent by weight). Whereas concentrated compositions tend to be preferred for commercial goods, the end consumer as a rule uses dilute compositions which have substantially lower concentrations of active ingredient.

Examples of foliar formulation types for pre-mix compositions are:

GR: Granules
WP: wettable powders
WG: water dispersable granules (powders)
SG: water soluble granules
SL: soluble concentrates
EC: emulsifiable concentrate
EW: emulsions, oil in water
ME: micro-emulsion
SC: aqueous suspension concentrate
CS: aqueous capsule suspension
OD: oil-based suspension concentrate, and
SE: aqueous suspo-emulsion.

Whereas, examples of seed treatment formulation types for pre-mix compositions are:

WS: wettable powders for seed treatment slurry
LS: solution for seed treatment
ES: emulsions for seed treatment
FS: suspension concentrate for seed treatment
WG: water dispersible granules, and
CS: aqueous capsule suspension.

Examples of formulation types suitable for tank-mix compositions are solutions, dilute emulsions, suspensions, or a mixture thereof, and dusts.

As with the nature of the formulations, the methods of application, such as foliar, drench, spraying, atomizing, dusting, scattering, coating or pouring, are chosen in accordance with the intended objectives and the prevailing circumstances.

The tank-mix compositions are generally prepared by diluting with a solvent (for example, water) the one or more pre-mix compositions containing different pesticides, and optionally further auxiliaries.

Suitable carriers and adjuvants can be solid or liquid and are the substances ordinarily employed in formulation technology, e.g. natural or regenerated mineral substances, solvents, dispersants, wetting agents, tackifiers, thickeners, binders or fertilizers.

Generally, a tank-mix formulation for foliar or soil application comprises 0.1 to 20%, especially 0.1 to 15%, of the desired ingredients, and 99.9 to 80%, especially 99.9 to 85%, of a solid or liquid auxiliaries (including, for example, a solvent such as water), where the auxiliaries can be a surfactant in an amount of 0 to 20%, especially 0.1 to 15%, based on the tank-mix formulation.

Typically, a pre-mix formulation for foliar application comprises 0.1 to 99.9%, especially 1 to 95%, of the desired ingredients, and 99.9 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Normally, a tank-mix formulation for seed treatment application comprises 0.25 to 80%, especially 1 to 75%, of the desired ingredients, and 99.75 to 20%, especially 99 to 25%, of a solid or liquid auxiliaries (including, for example, a solvent such as water), where the auxiliaries can be a surfactant in an amount of 0 to 40%, especially 0.5 to 30%, based on the tank-mix formulation.

Typically, a pre-mix formulation for seed treatment application comprises 0.5 to 99.9%, especially 1 to 95%, of the desired ingredients, and 99.5 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Whereas commercial products will preferably be formulated as concentrates (e.g., pre-mix composition (formulation)), the end user will normally employ dilute formulations (e.g., tank mix composition).

Preferred seed treatment pre-mix formulations are aqueous suspension concentrates. The formulation can be applied to the seeds using conventional treating techniques and machines, such as fluidized bed techniques, the roller mill method, rotostatic seed treaters, and drum coaters. Other methods, such as spouted beds may also be useful. The seeds may be presized before coating. After coating, the seeds are typically dried and then transferred to a sizing machine for sizing. Such procedures are known in the art. The compounds of the present invention are particularly suited for use in soil and seed treatment applications.

In general, the pre-mix compositions of the invention contain 0.5 to 99.9 especially 1 to 95, advantageously 1 to 50, % by mass of the desired ingredients, and 99.5 to 0.1, especially 99 to 5, % by mass of a solid or liquid adjuvant (including, for example, a solvent such as water), where the auxiliaries (or adjuvant) can be a surfactant in an amount of 0 to 50, especially 0.5 to 40, % by mass based on the mass of the pre-mix formulation.

The invention will now be illustrated by the following non-limiting Examples. All citations are incorporated by reference.

BIOLOGICAL EXAMPLES

Effect of Different Seed Treatments on Soybean Cv. Toliman Infected with *Fusarium virguliforme*:

| Treatment | Rate g ai/100 kg | % Infected plants | % Disease severity | Shoot dry weight in g | Shoot length in mm |
|---|---|---|---|---|---|
| Control non infected | 0 | 0 | 0 | 3.81 | 534 |
| Control infected | 0 | 100 | 100 | 1.04 | 218 |
| Compound 1 | 20 | 0 | 0 | 4.16 | 587 |
| Compound 1 | 10 | 28 | 17 | 3.57 | 505 |
| Compound 7 | 20 | 0 | 0 | 4.01 | 530 |
| Compound 7 | 10 | 4 | 1 | 4.09 | 565 |
| Compound 4 | 20 | 8 | 5 | 3.77 | 526 |
| Compound 4 | 10 | 8 | 5 | 3.89 | 541 |

*Fusarium virguliforme*/Soybean

5×5 soybean seeds cv. Toliman were sown into plastic pots. A mixture of 50% vol. sand and 50% vol. sterilized field soil was used as substrate. A layer of *F. virguliforme* infected millet seeds was placed below the soybean seeds. The test was kept in a growth chamber at 25° C. with 14 h artificial light; plants were irrigated up to field capacity. For the last five cultivation days, plants were kept at 18° C. The number of infected plants was counted 29 Days After Sowing (DAS).

Disease assessment was done visually 29 DAS, by classifying the plants according to a disease severity scale for SDS modified from Scandiani et al. (2011)* and J. Bond using classes from 0 to 4. The number of plants in each class were assessed. This allows calculating an "SDS Index" by multiplying the number of plants in each class with the disease severity (0, 1, 2, 3 or 4) and adding the products for all classes. SDS Index=n1×0+n2×1+n3×2+n4×3+n5×4. The SDS index is normalized to give an index of 100 for the untreated, infected control (UTCINF) and by calculating the normalized index for all treatments relative to the UTCINF. Shoot dry weight and shoot size was determined 29 DAS.

*Scandiani M., Ruberti D., Giorda L., Pioli R., Luque A., Bottai B., Ivancovich J., Aoki T., & O'Donnell K.: Comparison of inoculation methods for characterizing relative aggressiveness of two soybean sudden-death syndrome pathogens, *Fusarium virguliforme* and *F. tucumaniae*. Tropical Plant Pathology, vol. 36, 3, 133-140, 2011

Effect of Different Seed Treatments in the Field Against Sudden Death Syndrome (SDS) Caused by *Fusarium virguliforme*

A soybean field trial was carried out in Clinton, Ill., USA. This site had historically SDS occurrence reported. The seeds were applied with different compounds by using a rotostat seed treater and plated on May 31, 2017 using a 4 row disc planter. The disease occurred end of August and an assessment on disease incidence (counting of infected plants) was done Sep. 15, 2017. The yield of the grain data has been taken at the end of the season.

Treatment List—Field Trials:

| | Treatment | AI Rate (mg ai/seed) | Application method |
|---|---|---|---|
| 1 | UNTREATED* | — | — |
| 2 | FLUOPYRAM* (COMMERCIAL STANDARD SDHI)* | 0.15 | seed treatment |
| 3 | COMPOUND 1* | 0.15 | seed treatment |

*All treatments were applied with a base treatment of FLUDIOXONIL + METALAXYL-M + SEDAXANE + THIAMETHOXAM at 0.0038 + 0.0114 + 0.00379 + 0.076 mg ai/seed.

Methodology:

| | |
|---|---|
| Crop | Soybean |
| Planting date | May 31, 2016 |
| Target application timing | Seed Treatment (SAF) |
| Application volume | 400 mL/100 kg |
| Equipment used | Rotostat Seed Treater |
| Plot size | Planter width (4 rows), plot size 3 m × 8 m, 24 m2 per plot |
| Replication | 6 |
| Site Selection | Known history of frequent SDS occurence. |

Assessment

| Target | Assessments |
|---|---|
| Pest Incidence | Pest Incidence (%) based on number of infected plants per plot |
| Yield | Full plot harvest, Bushel per acre |

Pest Incidence (%), 107 Days after Planting

| | % disease incidence, significantly different (Treatments with no letter in common are significantly different at the 5% probability level) | % efficacy based on disease incidence Calculation method: 100 − (100/(untreated/treated)) |
|---|---|---|
| UNTREATED* | 60.00 A | — |
| FLUOROPYRAM* (COMMERCIAL STANDARD SDHI)* | 25.00 B | 58.33 |
| COMPOUND 1* | 12.17 B | 79.72 |

*All treatments were applied with a base treatment of FLUDIOXONIL + METALAXYL-M + SEDAXANE + THIAMETHOXAM at 0.0038 + 0.0114 + 0.00379 + 0.076 mg ai/seed.

Plot Yield (Bushel/Acre), 150 Days after Planting

| | Yield (bushel/acre), significantly different (Treatments with no letter in common are significantly different at the 5% probability level) | % yield increase Calculation method: yield treated − yield untreated |
|---|---|---|
| UNTREATED* | 71.04 A | — |
| FLUOROPYRAM* (COMMERCIAL STANDARD SDHI)* | 68.38 A | −3.74 |
| COMPOUND 1* | 79.15 A | 11.42 |

*All treatments were applied with a base treatment of FLUDIOXONIL + METALAXYL-M + SEDAXANE + THIAMETHOXAM at 0.0038 + 0.0114 + 0.00379 + 0.076 mg ai/seed.

CONCLUSION

Both tested compounds have reduced the disease incidence of *Fusarium virguliforme* significantly. The Compound 1 performed best with 79.72% efficacy, followed by compound Fluopyram (58.33). Compound 1 increased yield by 8.11 bushels per acre (11.42%) over the untreated check. Fluopyram did not increase the yield.

What is claimed is:

1. A method of controlling infestation of soybean plants by *Fusarium virguliforme*, comprising applying to a crop of plants, a locus of the crop plants, or propagation material of the crop plants, a compound of formula (Ic)

(Ic)

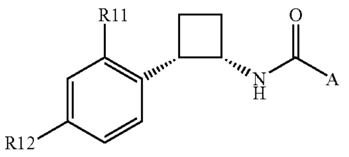

wherein:

A is 2-trifluoromethyl-pyrid-3-yl, R11 is Cl, and R12 is Cl;

A is 3-trifluoromethyl-pyrid-2-yl, R11 is Cl, and R12 is F; or

A is 2-trifluoromethyl-pyrid-3-yl, R11 is Cl, and R12 is F.

2. The method of claim 1, wherein the applying is to the crop of plants.

3. The method of claim 2, wherein A is 2-trifluoromethyl-pyrid-3-yl, R11 is Cl, and R12 is Cl.

4. The method of claim 2, wherein A is 3-trifluoromethyl-pyrid-2-yl, R11 is Cl, and R12 is F.

5. The method of claim 2, wherein A is 2-trifluoromethyl-pyrid-3-yl, R11 is Cl, and R12 is F.

6. The method of claim 1, wherein the applying is to the locus of the crop plants.

7. The method of claim 6, wherein A is 2-trifluoromethyl-pyrid-3-yl, R11 is Cl, and R12 is Cl.

8. The method of claim 6, wherein A is 3-trifluoromethyl-pyrid-2-yl, R11 is Cl, and R12 is F.

9. The method of claim 6, wherein A is 2-trifluoromethyl-pyrid-3-yl, R11 is Cl, and R12 is F.

10. The method of claim 1, wherein the applying is to the propagation material of the crop plants.

11. The method of claim 10, wherein A is 2-trifluoromethyl-pyrid-3-yl, R11 is Cl, and R12 is Cl.

12. The method of claim 10, wherein A is 3-trifluoromethyl-pyrid-2-yl, R11 is Cl, and R12 is F.

13. The method of claim 10, wherein A is 2-trifluoromethyl-pyrid-3-yl, R11 is Cl, and R12 is F.

* * * * *